W. G. SPANGLE & G. W. PARSONS.
FILING MEANS FOR RAILROAD TARIFFS, CIRCULARS, &c.
APPLICATION FILED SEPT. 3, 1908.

909,245.

Patented Jan. 12, 1909.
7 SHEETS—SHEET 1.

W. G. SPANGLE & G. W. PARSONS.
FILING MEANS FOR RAILROAD TARIFFS, CIRCULARS, &c.
APPLICATION FILED SEPT. 3, 1908.

909,245.

Patented Jan. 12, 1909.
7 SHEETS—SHEET 3.

W. G. SPANGLE & G. W. PARSONS.
FILING MEANS FOR RAILROAD TARIFFS, CIRCULARS, &c.
APPLICATION FILED SEPT. 3, 1908.

W. G. SPANGLE & G. W. PARSONS.
FILING MEANS FOR RAILROAD TARIFFS, CIRCULARS, &c.
APPLICATION FILED SEPT. 3, 1908.

909,245.

Patented Jan. 12, 1909.

W. G. SPANGLE & G. W. PARSONS.
FILING MEANS FOR RAILROAD TARIFFS, CIRCULARS, &c.
APPLICATION FILED SEPT. 3, 1908.

909,245.

Patented Jan. 12, 1909.
7 SHEETS—SHEET 6.

Fig. 11.

UNITED STATES PATENT OFFICE.

WILLIAM G. SPANGLE, OF MILTON, AND GEORGE W. PARSONS, OF WILLIAMSPORT, PENNSYLVANIA.

FILING MEANS FOR RAILROAD TARIFFS, CIRCULARS, &c.

No. 909,245.　　　　　Specification of Letters Patent.　　　　　Patented Jan. 12, 1909.

Application filed September 3, 1908. Serial No. 451,509.

*To all whom it may concern:*

Be it known that we, WILLIAM G. SPANGLE and GEORGE W. PARSONS, citizens of the United States, and residents of Milton, Northumberland county, and Williamsport, Lycoming county, respectively, in the State of Pennsylvania, have invented certain new and useful Improvements in Filing Means for Railroad Tariffs, Circulars, &c., of which the following is a specification.

This invention relates to a filing system for railroad tariffs, general notices, circulars, etc. Its object is to provide means by which the various agents of a railroad system may keep the tariffs, general notices, circulars and similar papers sent him in such shape that they can be easily and quickly found and referred to as occasion demands. It includes means by which any particular paper may be identified and found by a knowledge of the subject to which it relates, the railroad to which it relates, or its number. It contemplates the use of the same character of filing means by all of the agents of a system whereby any agent or employee may easily find any paper desired in any office belonging to the company, whether it is his own office or the office of some other agent.

To the ends above indicated our invention contemplates the use of any desired number of loose leaf binders lettered consecutively, and in the drawing we have shown them lettered from A to N, each containing separating leaves or sheets carrying guide numbers and sub-index numbers. The guide numbers are consecutively arranged and the sub-index numbers are arranged consecutively upon succeeding sheets under each guide number. The tariffs, circulars, etc. are placed each in its proper binder between the leaves under the proper index number and proper sub-index number, which are ascertained by the means hereafter described. In combination with this loose leaf binder we use two indexes arranged alphabetically, one indicating the railroad referred to in the circular, and the other indicating the subject-matter of the circular. It will be understood that each circular is entered in each of these indexes at the proper place and opposite each entry there is placed the letter of the loose leaf binder in which the circular is placed together with index and sub-index numbers of the leaves in that binder where the circular appears. These indexes are to be printed and furnished to each of the agents so as to insure that there will be uniformity in filing the circulars in the loose leaf binders by the various agents, and so that the same circular will be placed by all agents in the same binder and under the same index and sub-index numbers. We also use a third index for the purpose of identifying the circulars etc. by means of the numbers and other series indicating marks which are placed thereon, when they are printed. This index has pages numbered consecutively from 00 to 99 and the various circulars, orders, etc. are entered therein on the page having the number corresponding with the last two numerals of the number printed on the circular. The circulars are entered in this index only by numbers, but in connection with the number there is entered any series indicating marks printed on the circulars as well as the letter of the loose leaf binder in which the circular is to be placed and the proper index and sub-index number in that binder where the circular appears. By this index any circular may be found in the loose leaf binder even if its subject-matter and the road to which it relates are not known so long as its number is known. The three indexes above mentioned are made up of loose leaves placed in binders so that substitutions may be made as desired and for convenience the first two indexes may be placed in a single binder.

For convenience, in the following description we will refer to the various indexes respectively as "name index," "subject-matter index" and "number index."

Our invention will be more fully understood by reference to the accompanying drawings taken in connection with the following description thereof.

Figure 1:
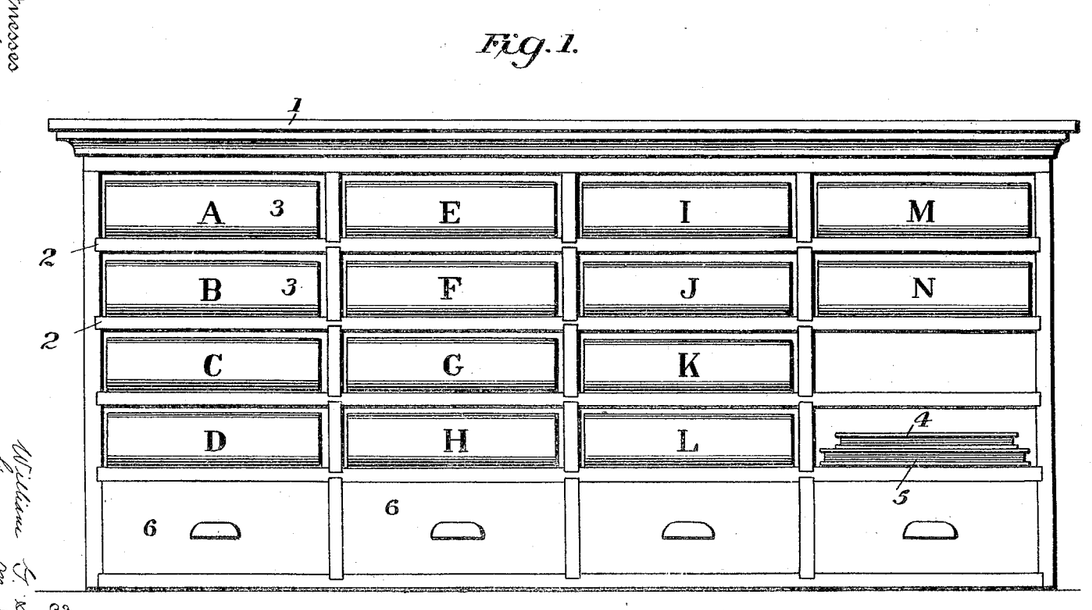
Figure 1 is a view of a cabinet containing the elements which go to make up our invention.

As shown in these drawings the cabinet 1 is provided with shelves 2 which receive the loose leaf binders 3, which binders are consecutively lettered from A to N. This cabinet also holds the binders 4 and 5 which contain the indexes. At the bottom of the cabinet drawers 6 may be provided for containing stationery, letters, etc. It will be understood that all of the loose leaf binders for the orders, etc., are constructed alike, and therefore it is necessary to describe only one of them.

Figure 2:
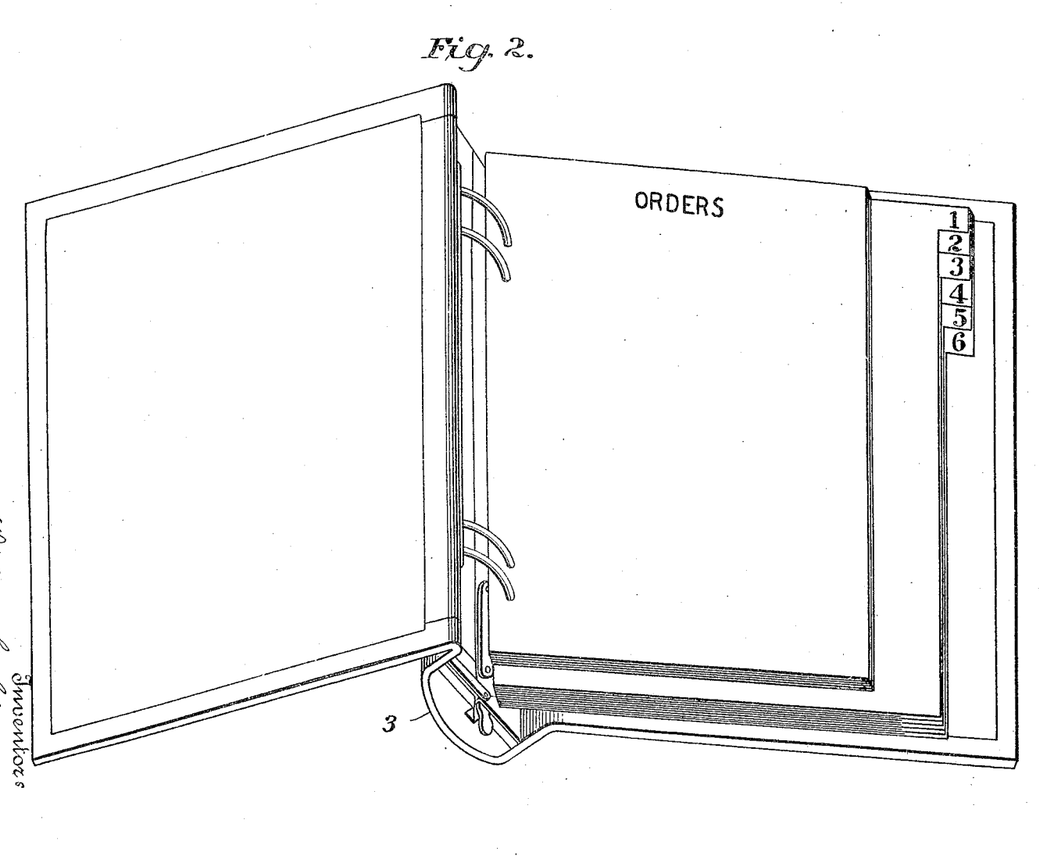
Fig. 2 is a perspective view of the loose leaf binder which contains the orders, notices, etc.
Figure 3:
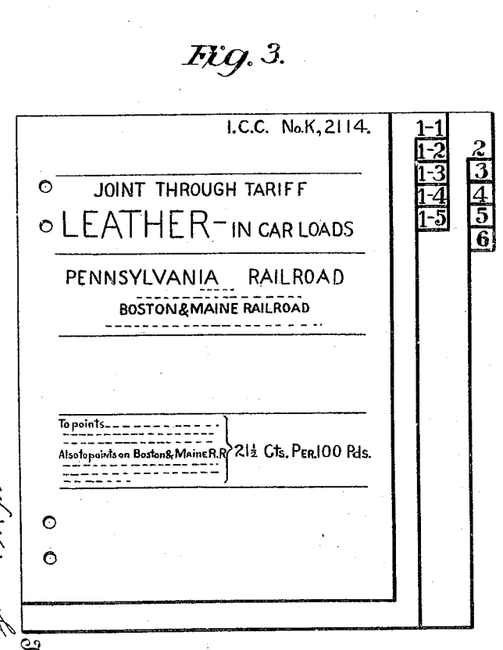
Fig. 3 is a plan view of one page of the binder showing a freight tariff in place.
Figure 4:
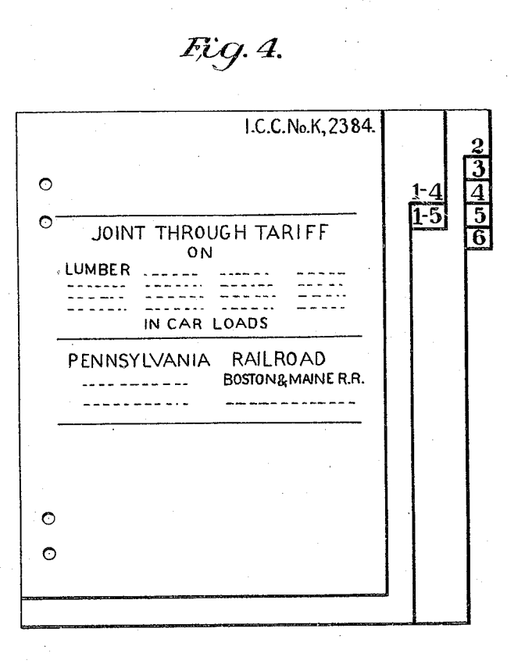
Fig. 4 is a plan view of another page of the binder showing another tariff.

It will be seen by reference to Fig. 2 that the loose leaf binder 3 is constructed in the ordinary way to contain loose leaves or other papers. In this binder we place a series of loose leaves or sheets marked on visible margins with consecutive numbers, in this instance the numbers going from 1 to 6. These leaves are what we term "index leaves", and the numbers thereon are the index numbers. Between any two of these index leaves we place a series of sub-index leaves as illustrated in Fig. 3, which sub-index leaves are shown as narrower, so that their margins do not show beyond the edge of the index leaves. The sub-index leaves need not be narrower so long as the tabs or extensions containing the numbers are so arranged that the index and sub-index numbers are readily distinguishable. This may be effected where the leaves are the same width by having the index numbers extend beyond the sub-index numbers on longer tabs or extensions. These sub-index leaves are consecutively numbered upon visible margins, and each leaf contains, in addition to its consecutive numbering, the number of the index leaf under which it is placed.

It will be understood that the circulars, notices, orders, etc., are placed in their proper positions between the proper sub-index leaves, and are there secured in the binder. The particular place in the binders where any particular notice or order is to go is determined at the main office of the company and is indicated in the index system hereafter described, which is furnished to each of the agents.

Figure 5:
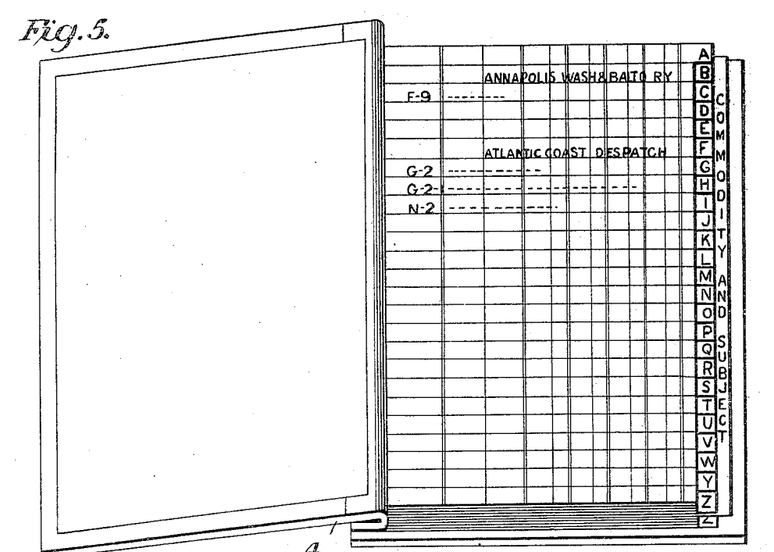
Fig. 5 is a perspective view of the name index.
Figure 6:
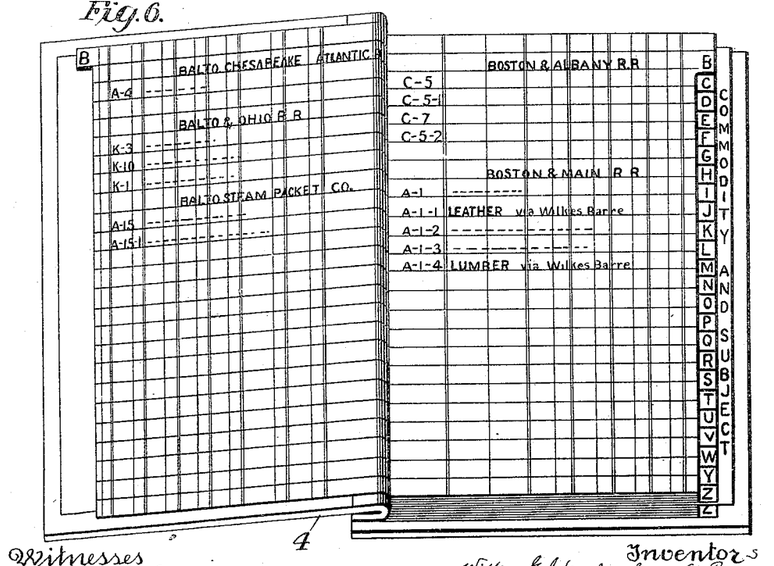
Fig. 6 is a perspective view of the name index open at a different page.

All orders, notices and circulars are entered in the name index illustrated in Figs. 5 and 6, and they are placed therein alphabetically upon the proper pages according to the name of the railroad to which they refer. The name of the railroad is entered in this index and underneath the name there is entered information as to the subject matter or character of each notice or order relating to that road, and opposite the entry relating to each order there is placed the letter of the loose leaf binder in which that particular order is placed as well as the index number and the sub-index number of the pages between which the order appears. For instance, in Fig. 6, under the head of "Boston & Maine Railroad" there is an entry of an order relating to leather via Wilkes-Barre, and opposite this entry is the entry "A—1—1", thus indicating that the order here referred to is placed in the loose leaf binder marked "A" under the index leaf 1, and the sub-index leaf 1. From this index therefore the agent may easily and quickly turn to the order in the loose leaf binder.

Figure 7:
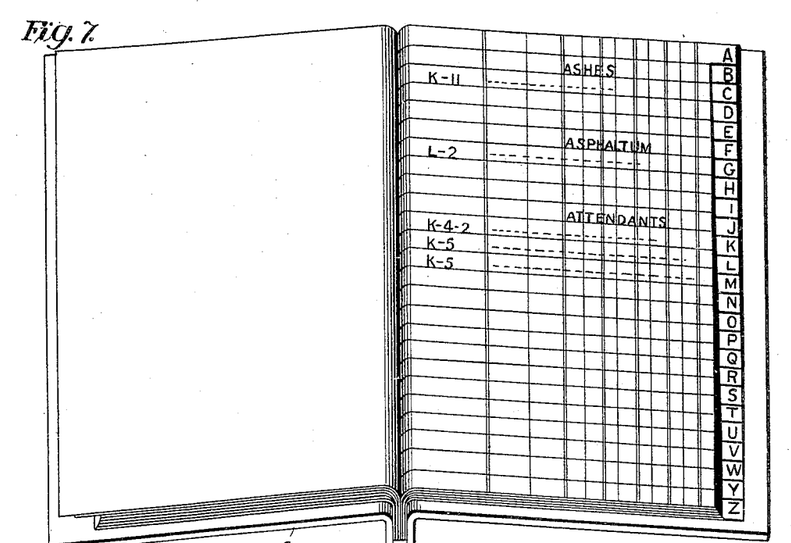
Fig. 7 is a perspective view of the subject-matter index.
Figure 8:
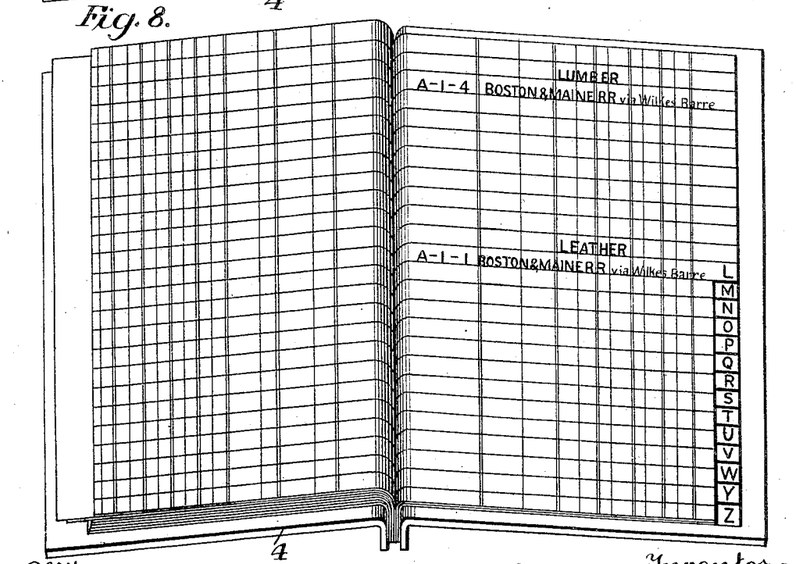
Fig. 8 is a similar view of the index open at a different page.

The subject-matter index shown in Figs. 7 and 8 is made up of loose leaves held together in a binder upon which leaves the various orders are entered according to the subject-matter to which they relate. For instance, as shown in Fig. 8, on the page marked at the margin "L" there are entries relating to lumber and leather. Under these subject-matter titles the names of the railroads referred to in the particular orders are entered and opposite each entry there is entered the letter of the loose leaf binder in which the order appears, as well as the index and sub-index numbers of the pages between which it is placed. In this particular instance it will be noticed that the entry of leather on the Boston & Maine Railroad via Wilkes-Barre has opposite to it "A—1—1", and it will be seen by reference to Fig. 3 that the order referring to this subject-matter is placed in the binder A under the index number 1 and the sub-index number 1. The leaves of this index as well as the name index are removable and are furnished to the agents by the main office so as to secure uniformity in filing. These two indexes for convenience we bind in a single loose leaf binder, but it is of course clear that they might be bound separately.

Figure 9:
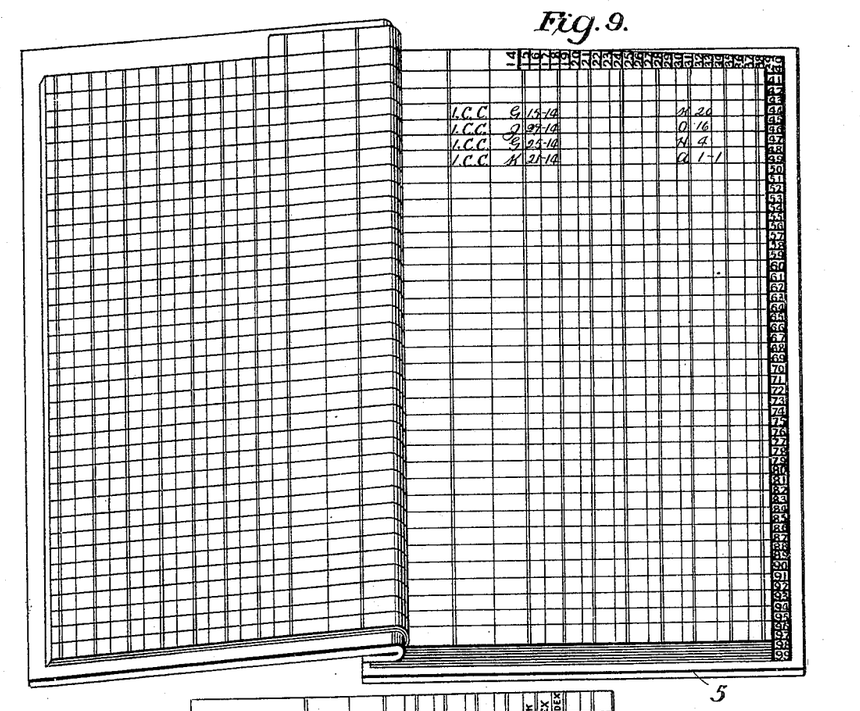
Fig. 9 is a perspective view of the number index.
Figure 10:
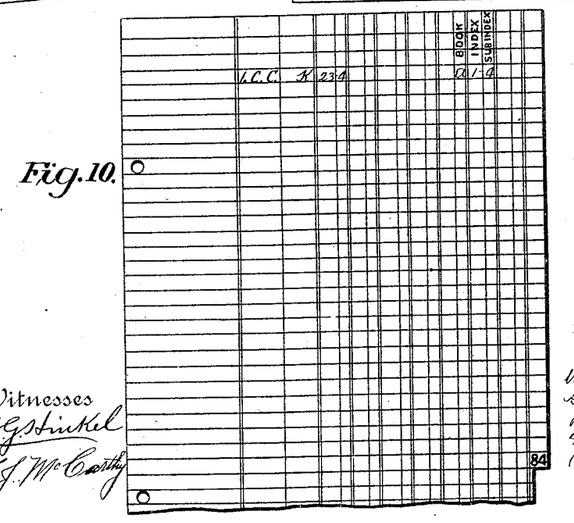
Fig. 10 is a plan view of a portion of one page contained in the number index.

The orders, circulars and notices sent out by the railroad system are numbered and also have thereon certain series and subject-matter indicating marks. For instance the tariff shown in Fig. 3 has marked upon its upper right hand corner "I. C. C.—G #1514". It is sometimes desirable to find an order or circular when nothing is known in regard to it by the agent, except its number, and for this purpose we have provided the number index shown in Figs. 9 and 10. As will be seen this index is made up of a loose leaf binder containing leaves consecutively numbered from 00 to 99. The orders, circulars, etc. are classified and entered in this index in accordance with the last two numerals of the numbers of the various orders. For instance, all orders whose numbers end in 14 are entered on page 14 as indicated in Fig. 9. On the same line with the number of the order we enter the letter of the loose leaf binder in which the order appears, together with the index and sub-index numbers. We also enter the series and other character indicating marks printed on the order itself. An illustration of this will be seen on Fig. 9 where there is the entry "I. C. C.—K 2114 A—1—1", thus indicating that the order 2114 appears in the binder A under the index and sub-index numbers 1.

It will be understood that the index leaves may be printed by the main office of the company and furnished to the various agents, thus insuring uniformity of action on the part of the various agents in placing the orders in the loose leaf binders, and it will be clear that by this system any officer of the company familiar with the method of filing may go into the office of any agent and be able, by means of the index to turn at once to any particular order which he may desire. This is of great advantage where agents are transferred from one office to another and where an employee is sent to a new office for the purpose of assisting the agent or of taking the place of an agent who is absent.

Figure 11:
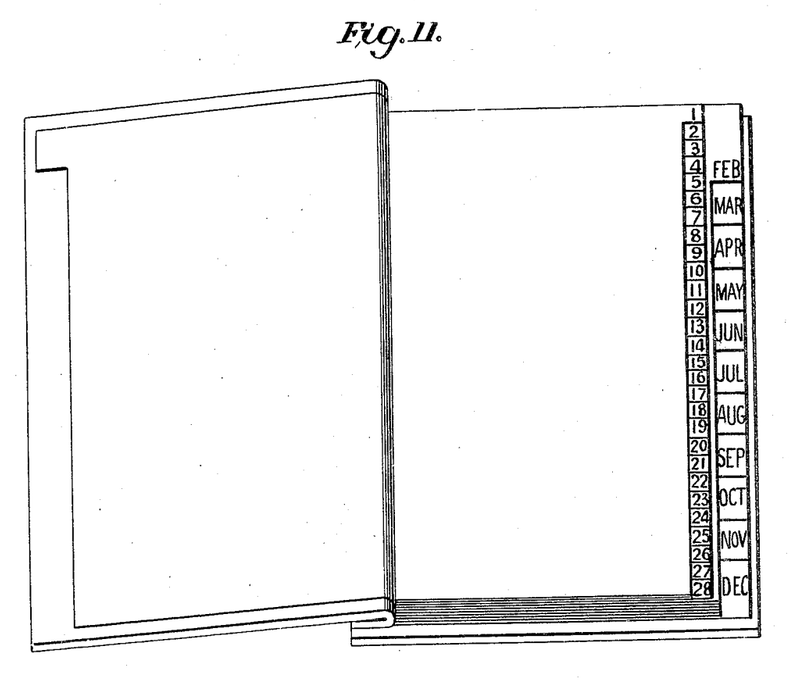
Fig. 11 is a perspective view of the inoperative order file.

Orders, notices, etc. sent out by the company are not always operative from the date of issue, but take effect at some future date. In order to avoid confusion and to keep these orders separate from those which are actually in force we provide a loose leaf binder for containing these orders, as shown in Fig. 11. We place these orders in a separate binder so that they will not be confused with the operative orders which are contained in the loose leaf binder 3. The binder for these inoperative orders contains separating leaves divided and marked according to months from January to December, and between the leaves representing two consecutive months we place a series of separating leaves numbered consecutively with the days of the month. The orders are placed between these leaves in accordance with the month and day when they become operative, and thus the agent can each day turn to the proper page in this inoperative order file and see just what orders then become operative, and he will then of course take them out of this file and place them in the loose leaf binder 3 in the proper place, as indicated above.

While we have described our system and means for filing orders as particularly adapted for use by large railroad systems, it is of course clear that it is adapted for other analogous uses by other companies, or individuals, and therefore we do not wish to limit ourselves to the particular use. It can be installed to advantage in a single office without reference to any other office or offices.

It will be observed that our system is capable of indefinite expansion or contraction to suit the needs of the particular office in which it is used.

While we have shown in the drawing loose leaf binders lettered from A to N it will be understood that a greater or less number may be used and that they may be consecutively marked in any suitable way.

What is claimed is:

1. The combination with a loose leaf binder, containing separating index leaves properly marked and sub-index leaves properly marked between which pages notices, circulars and general orders are adapted to be placed, of an index in the form of a loose leaf binder having pages alphabetically arranged, the said pages having columns to receive the index and sub-index numbers as well as the name of the railroad or other company referred to in the orders, circulars, etc. placed in the loose leaf binder, and a second index similarly constructed and arranged containing columns for the index and sub-index numbers and a column for the title of the notices, circulars, etc. by subject-matter.

2. The combination with a loose leaf binder containing separating index leaves properly marked and sub-index leaves properly marked between which pages notices, circulars and general orders are adapted to be placed, of an index in the form of a loose leaf binder having pages alphabetically arranged, the said pages having columns to receive the index and sub-index numbers, as well as the name of the railroad or other company referred to in the orders, circulars, etc. placed in the loose leaf binder, a second index similarly constructed and arranged containing columns for the index and sub-index numbers and a column for the title of the notices, circulars, etc. by subject-matter, and a third index in the form of a loose leaf binder having pages numbered consecutively from 00 to 99, the said pages having columns to receive the numbers of the orders, circulars, etc. classified according to the last two numerals of the numbers and to receive series marks of said orders, circulars, etc. as well as the index and sub-index numbers.

3. The combination with a series of loose leaf binders consecutively lettered containing separating index leaves properly numbered and sub-index leaves properly numbered adapted to receive notices, circulars, orders, etc. between them, of a name index made up of removable lettered pages, having columns for the names of the notices, circulars, etc., the letters of the loose leaf binders, the index numbers and the sub-index numbers.

4. The combination with a series of loose leaf binders consecutively lettered containing separating index leaves properly numbered and sub-index leaves properly numbered adapted to receive notices, circulars, orders, etc. between them, of a name index made up of removable lettered pages, having columns for the names of the notices, circulars, etc., the letters of the loose leaf binders, the index numbers and the sub-index numbers, and a subject-matter index made up of removable lettered pages having columns for the subject-matter of the notices, circulars, etc., the letters of the loose leaf binders, the index numbers and the sub-index numbers.

5. The combination with a series of loose leaf binders consecutively lettered containing separating index leaves properly numbered and sub-index leaves properly numbered adapted to receive notices, circulars, orders, etc. between them of a name index made up of removable lettered pages, having columns for the names of the notices, circulars, etc., the letters of the loose leaf binders, the index numbers and the sub-index numbers, a subject-matter index made up of removable lettered pages having columns for the subject matter of the notices, circulars, etc., the letters of the loose leaf binders, the index numbers and the sub-index numbers, and a number index made up of removable pages numbered from 00 to 99 having columns to receive the letters of the loose leaf binders, the index and sub-index numbers, the series and other identifying marks on the notices, circulars, etc. as well as the numbers of the orders classified on the appropriate pages by the last two numerals of the numbers.

6. The combination with a loose leaf binder containing separating index leaves consecutively numbered and sub-index leaves consecutively numbered between said index leaves and adapted to receive and hold between them circulars, notices, orders, etc., of a name index for the circulars, notices, etc., a subject-matter index, and a number index, each of said indexes containing the index and sub-index numbers of the loose leaf binder indicating where each circular, notice, etc. is placed.

7. The combination with a loose leaf binder containing separating index leaves consecutively numbered and sub-index leaves consecutively numbered between said index leaves and adapted to receive and hold between them circulars, notices, orders, etc., of a name index for the circulars, notices, etc., a subject matter index, a number index each of said indexes containing the index and sub-index numbers of the loose leaf binder indicating where each circular, notice, etc., is placed, and an inoperative order file in the form of a loose leaf binder having separating leaves marked consecutively according to months and the days of the month.

In testimony whereof we affix our signatures in presence of two witnesses.

WILLIAM G. SPANGLE.
GEORGE W. PARSONS.

Witnesses:
W. L. FRY,
EDWIN PAUL.